July 6, 1954  R. C. HIATT  2,682,742

AIR CONVEYER FOR NUT OR FRUIT HARVESTERS

Filed May 1, 1951

INVENTOR
ROBERT C. HIATT

BY

ATTORNEY

Patented July 6, 1954

2,682,742

UNITED STATES PATENT OFFICE 2,682,742

AIR CONVEYER FOR NUT OR FRUIT HARVESTERS

Robert C. Hiatt, Hillsboro, Oreg.

Application May 1, 1951, Serial No. 223,987

1 Claim. (Cl. 56—328)

This invention relates to high velocity air conveyors which is particularly adapted for the picking up of nuts, prunes and the like from the ground surface.

The primary object of this invention is to be able to pick up nuts or fruit from the ground without damaging them, delivering them into a receiving station.

In the gathering of nuts or fruit from the ground, this invention is adapted to work in coordination with a raking mechanism which is disclosed in my Patent No. 2,514,699, and related to nut picking machines disclosed in my Patent No. 2,594,776, although I do not wish to be limited to this particular mechanism, but it does work very effectively with this improved conveyor.

In the picking up of nuts or fruit from the ground surface into a high velocity air stream, the nozzle must be designed as I illustrate in the drawings, substantially in the specific form as shown in order to be able to gather the nuts or fruit into the conveyor and air stream for delivering the same to a distant point.

These and other incidental objects will be apparent in the drawings, specification and claim.

Referring to the drawings.

Figure 2:
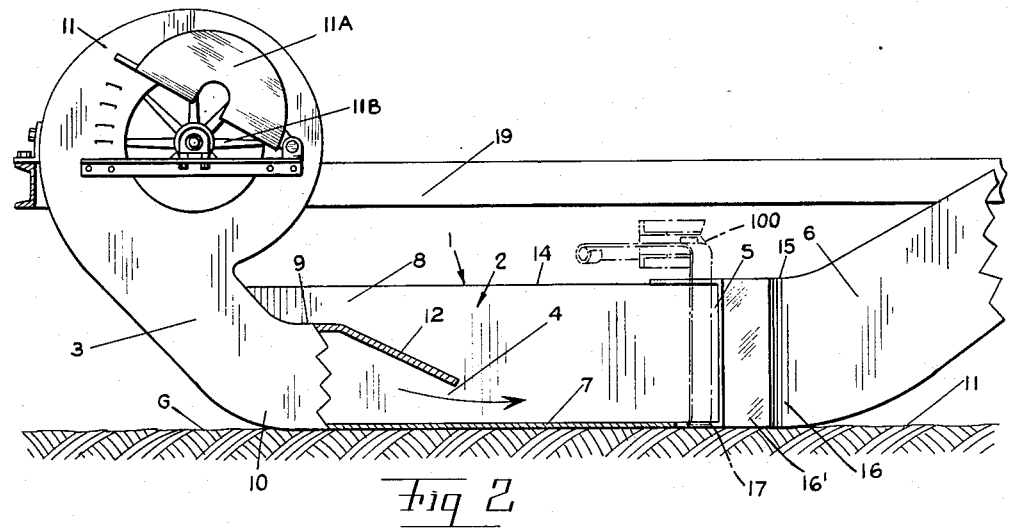
Figure 2 is a side view of Figure 1, taken on line 2—2, partially broken away for convenience of illustration.

Referring now to the drawing, a conveyor or collecting and pick-up means for a nut or fruit harvester, in accordance with the present invention, comprises a chute 1 having a central horizontal portion 2 with upwardly inclined end portions 3 and 6 which have open ends defining inlet and outlet openings 4 and 5, respectively. The horizontal portion 2 has a bottom wall 7 and an outer vertical side wall 8, but this horizontal portion is open at the top and the inner side.

The inclined inlet end portion 3 has a top wall 9 at the lower end thereof that is disposed below the maximum upper edge 14 of the side wall 8 of the horizontal portion 2 and extends down into the open top of the horizontal portion 2. The portion 3 has an inside wall 10 even with the inner edge of the bottom wall 7. At its upper end, the inlet portion 3 is connected with a fan casing 11 having an inlet opening regulated by a pivotally mounted valve member or damper 11A and enclosing a fan 11B. At the open inlet end, the top wall 9 terminates in a downwardly inclined portion 12 and the side wall 10 terminates in a portion 13 inclined toward the outer sidewall 8 so as to form a nozzle and restrict the size of the opening 4.

Figure 1:
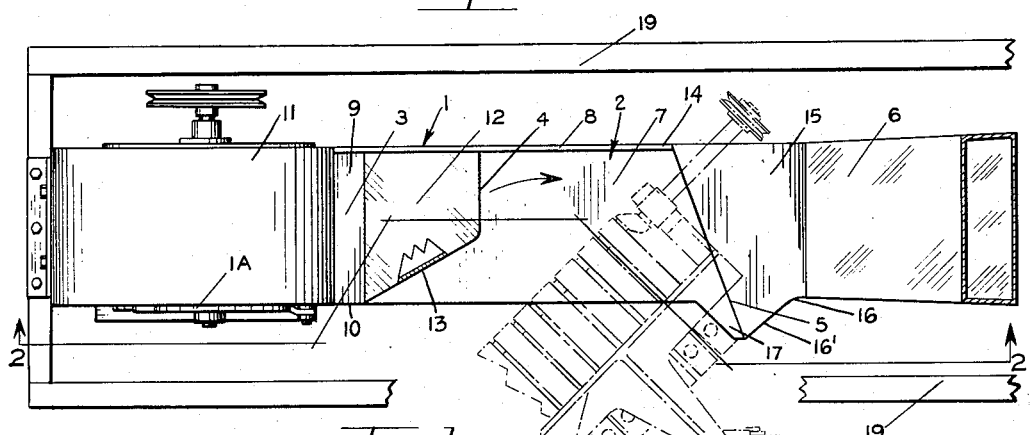
Figure 1 is a plan view of my new and improved pick up conveyor, partially broken away for convenience of illustration, illustrating the air nozzle in relation to the mouth of the conveyor.
Figure 3:
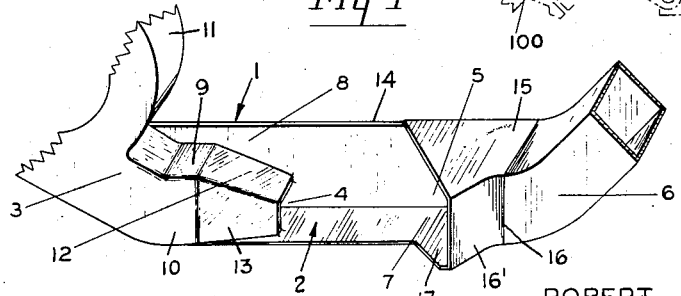
Figure 3 is a side perspective view drawn to a smaller scale of the air nozzle in combination with the mouth of the conveyor.

The inclined outer end portion 6 has a top wall 15 that is level with the upper edge 14 of the side wall 8 of the horizontal portion and the inner side wall 16 has a flared portion 16' that is braced by an extension 17 on the bottom wall 7 of the horizontal portion 2. The upper wall 15 and the flared portion 16' cooperate with the walls 7 and 8 in defining the outlet opening 5, and, consequently, the outlet opening 5 is larger than the inlet nozzle opening 4. Moreover, the side walls of the inclined portion 6 may be slightly inclined apart and are so shown in Fig. 1.

The chute 1 is secured to a frame 19 which may be connected with nut or fruit raking or harvesting machines, particularly those such as disclosed in my aforementioned patents.

In operation, the frame 19 is coupled with the harvesting machine with the rake or gathering unit 100 thereof extending at one end into the open side and top of the horizontal portion 2 of the chute 1. The bottom wall 7 of the chute 1 rides on the ground surface G. Thus, the chute is moved with the machine and the nuts or fruit are delivered by the pick-up mechanism 100 onto the bottom wall 7 and within the horizontal chute portion 2. Air is delivered by the fan 11B through the inlet portion 3 and is projected along the horizontal portion 2 from the nozzle opening 4 into the outlet opening 5. This projected air stream blows the nuts or fruit into the opening 5 and up through the chute portion 6 to the end thereof. As the outlet opening 5 is somewhat larger than the opening 4, all of the nuts that are subject to the air stream are received therein. The gradually expanded chute portion 6 precludes back pressure so that the nuts will flow therethrough without adverse pressure disturbances. The volume of air delivered by the fan 11B may be regulated by the damper 11A.

Although a certain specific embodiment of the invention has been described herein and shown in the accompanying drawing, it is obvious that modifications are possible. The invention, therefore, is not to be restricted except insofar as is necessitated by the spirit of the appended claim.

What I claim is:

Means for collecting nuts from a nut harvester, comprising a chute, the chute having a central horizontal portion and upwardly inclined end portions with open ends, the latter forming inlet and outlet openings, the horizontal portion being open at the top and on one side, the bottom portion serving as a runner to slide over the surface of the ground in proximity to a nut gatherer of a nut harvesting machine, a fan casing connected to the inclined inlet end portion of the chute, a fan in the casing, the top of the lower end of the inclined inlet end portion of the chute extending into the open top of the horizontal portion and below the top edge thereof, the side edge adjacent the open side of the horizontal portion inclining inwardly toward the opposite closed side of the chute, a vertical portion connecting the inclined edge of the bent down top and the bottom of the horizontal portion to form a restricted nozzle for injecting forced air through the open horizontal portion, the outlet end of the horizontal portion of the chute at its juncture with the upwardly inclined end portion being transversely enlarged to form a mouth to receive nuts delivered by a nut harvester into the current of air from the restricted nozzle and blown through the exit end of the chute.

References Cited in the file of this patent

UNITED STATES PATENTS

| Number | Name | Date |
| --- | --- | --- |
| 696,812 | Hagemeister | Apr. 1, 1902 |
| 975,230 | Hagen | Nov. 8, 1910 |
| 1,263,364 | Bernert | Apr. 23, 1918 |
| 1,534,111 | Graham | Apr. 21, 1925 |
| 1,676,757 | West | July 10, 1928 |
| 2,493,422 | Sartin | Jan. 3, 1950 |